(12) United States Patent
Pickford

(10) Patent No.: US 9,585,414 B2
(45) Date of Patent: *Mar. 7, 2017

(54) CRUMB COATING FOR FOOD PRODUCTS

(71) Applicant: CRISP SENSATION HOLDINGS S.A., Geneva (CH)

(72) Inventor: Keith Graham Pickford, Manchester (GB)

(73) Assignee: Crisp Sensation Holding S.A., Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,762

(22) Filed: Jun. 12, 2015

(65) Prior Publication Data

US 2016/0106127 A1   Apr. 21, 2016

Related U.S. Application Data

(60) Division of application No. 13/953,585, filed on Jul. 29, 2013, now Pat. No. 9,295,272, which is a continuation of application No. 12/669,953, filed as application No. PCT/GB2009/001617 on Jun. 30, 2009, now Pat. No. 8,524,301.

(30) Foreign Application Priority Data

Jul. 1, 2008 (GB) .................................. 0811970.3

(51) Int. Cl.
| | | |
|---|---|---|
| A23L 1/176 | (2006.01) | |
| A23L 1/00 | (2006.01) | |
| A23L 3/005 | (2006.01) | |
| A23L 1/053 | (2006.01) | |
| A23L 1/0534 | (2006.01) | |
| A23L 1/315 | (2006.01) | |

(52) U.S. Cl.
CPC ............. *A23L 1/176* (2013.01); *A23L 1/005* (2013.01); *A23L 1/0023* (2013.01); *A23L 1/0079* (2013.01); *A23L 1/053* (2013.01); *A23L 1/0534* (2013.01); *A23L 1/3157* (2013.01); *A23L 3/005* (2013.01); *A23L 7/157* (2016.08); *A23L 13/57* (2016.08); *A23L 29/25* (2016.08); *A23L 29/262* (2016.08); *A23P 10/25* (2016.08); *A23P 20/12* (2016.08); *A23P 30/25* (2016.08); *A23V 2002/00* (2013.01)

(58) Field of Classification Search
CPC ........ A23L 1/0023; A23L 1/005; A23L 1/176; A23L 1/0088; A23L 1/0083; A23L 1/0082
USPC ....... 426/446, 447, 448, 449, 450, 451, 456, 426/458, 464, 549, 94, 96
See application file for complete search history.

(56) References Cited

U.S. PATENT DOCUMENTS

| | | |
|---|---|---|
| 2,446,175 A | 8/1948 | Gerber |
| 3,067,921 A | 12/1962 | Reifers |
| 3,052,545 A | 9/1963 | Ducharme et al. |
| 3,208,851 A | 9/1965 | Antinori et al. |
| 3,251,531 A | 5/1966 | Hook et al. |
| 3,399,062 A | 8/1968 | Willard, Jr. et al. |
| 3,486,904 A | 12/1969 | Ziegler |
| 3,586,512 A | 6/1971 | Mancuso et al. |
| 3,597,227 A | 8/1971 | Murray et al. |
| 3,619,208 A | 11/1971 | Bahoshy et al. |
| 3,656,969 A | 4/1972 | Horn |
| RE27,531 E | 12/1972 | Murray et al. |
| 3,751,268 A | 8/1973 | van Patten et al. |
| 3,857,976 A | 12/1974 | Szymanski et al. |
| 3,899,602 A | 8/1975 | Rutenberg et al. |
| 3,904,429 A | 9/1975 | Eastman et al. |
| 3,904,601 A | 9/1975 | Tessler et al. |
| 3,915,532 A | 10/1975 | Ashton |
| 3,956,515 A | 5/1976 | Moore et al. |
| 3,969,340 A | 7/1976 | Tessler et al. |
| 3,970,767 A | 7/1976 | Tessler et al. |
| 4,020,564 A | 5/1977 | Bayliss |
| 4,068,009 A | 1/1978 | Rispoli et al. |
| 4,192,900 A | 3/1980 | Cheng |
| 4,208,442 A | 6/1980 | Evans et al. |
| 4,218,485 A | 8/1980 | Lee et al. |
| 4,260,637 A | 4/1981 | Rispoli et al. |
| 4,308,286 A | 12/1981 | Anstett et al. |
| 4,342,788 A | 8/1982 | Clatfelter |

(Continued)

FOREIGN PATENT DOCUMENTS

| | | |
|---|---|---|
| CA | 980164 | 12/1975 |
| DE | 2220528 | 12/1972 |

(Continued)

OTHER PUBLICATIONS

U.S. Appl. No. 14/032,881, "Microwaveable Batter," Keith Graham Pickford, filed Sep. 20, 2013.
U.S. Appl. No. 12/764,407, Office Action mailed Oct. 25, 2013.
U.S. Appl. No. 13/015,491, Office Action mailed Nov. 8, 2013.
U.S. Appl. No. 14/105,847, "Stabilized Cheese Products," van der Kolk et al., filed Dec. 13, 2013.
U.S. Appl. No. 13/015,486, Office Action mailed Jan. 6, 2014.
U.S. Appl. No. 12/764,407, Notice Allowance mailed Feb. 12, 2014.

(Continued)

*Primary Examiner* — Walter Moore
(74) *Attorney, Agent, or Firm* — Nyemaster Goode P.C.

(57) ABSTRACT

A crumb is manufactured by a process including adding an aqueous flour mixture into an extruder, partially extruding the aqueous mixture through the extruder, adding an aqueous gelling agent to the extruder at a point downstream of the start of the extrusion of the aqueous mixture through the extruder to form a resultant mixture of the aqueous mixture and the aqueous gelling agent in the extruder, and extruding the resultant mixture at a temperature greater than 100° C. to form an extrudate. The extrudate is allowed to expand, dried and milled to form the crumb, which has moisture-resistant properties particularly well-suited for use on frozen, microwavable food products.

20 Claims, No Drawings

(56) References Cited

U.S. PATENT DOCUMENTS

| | | |
|---|---|---|
| 4,364,961 A | 12/1982 | Darley et al. |
| 4,393,088 A | 7/1983 | Matsusaka |
| 4,415,599 A | 11/1983 | Bos |
| 4,423,078 A | 12/1983 | Darley et al. |
| 4,427,706 A | 1/1984 | El-Hag |
| 4,440,793 A | 4/1984 | Seki |
| 4,568,550 A | 2/1986 | Fulger et al. |
| 4,568,555 A | 2/1986 | Spanier |
| 4,588,600 A | 5/1986 | Suderman |
| 4,597,974 A | 7/1986 | Fonteneau et al. |
| 4,609,557 A | 9/1986 | Mao et al. |
| 4,609,558 A | 9/1986 | Giacone et al. |
| 4,623,552 A | 11/1986 | Rapp |
| 4,767,637 A | 8/1988 | Ek |
| 4,778,684 A | 10/1988 | D'Amico et al. |
| 4,864,089 A | 9/1989 | Tighe et al. |
| 4,908,487 A | 3/1990 | Sarnoff et al. |
| 4,913,918 A | 4/1990 | Stypula |
| 4,915,970 A | 4/1990 | Coffey |
| 4,961,831 A | 4/1990 | Yasumara et al. |
| 4,943,438 A | 7/1990 | Rosenthal |
| 4,948,608 A | 8/1990 | Stypula et al. |
| 4,978,541 A | 12/1990 | Stypula et al. |
| 5,049,711 A | 9/1991 | August |
| 5,057,329 A | 10/1991 | Stypula et al. |
| 5,088,179 A | 2/1992 | Gibbon |
| 5,093,176 A | 3/1992 | Pribonic et al. |
| 5,175,010 A | 12/1992 | Roig et al. |
| 5,202,138 A | 4/1993 | Stypula et al. |
| H001229 H | 9/1993 | McGinley et al. |
| 5,266,340 A | 11/1993 | Samson et al. |
| 5,281,432 A | 1/1994 | Zallie et al. |
| 5,308,636 A | 5/1994 | Tye et al. |
| 5,310,977 A | 5/1994 | Stenkamp et al. |
| 5,310,980 A | 5/1994 | Beckett et al. |
| 5,321,900 A | 6/1994 | Meyer |
| 5,350,585 A | 9/1994 | Sunderland |
| 5,423,477 A | 6/1995 | Valdman et al. |
| 5,431,944 A | 7/1995 | Melvej |
| 5,433,966 A | 7/1995 | Wolt et al. |
| 5,492,707 A | 2/1996 | Chalupa et al. |
| 5,523,102 A | 6/1996 | Morasch |
| 5,565,132 A | 10/1996 | Sayler |
| 5,601,861 A | 2/1997 | Gerrisch et al. |
| 5,736,178 A | 4/1998 | Cook et al. |
| 6,097,017 A | 8/2000 | Pickford |
| 6,214,403 B1 | 4/2001 | Broberg et al. |
| 6,261,625 B1 | 7/2001 | Pickford |
| 6,287,621 B1 | 9/2001 | Lacourse et al. |
| 6,288,179 B1 | 9/2001 | Bauer et al. |
| 6,326,599 B1 | 12/2001 | Pickford |
| 6,399,130 B2 | 6/2002 | Parker |
| 6,413,562 B2 | 7/2002 | Conforti et al. |
| 6,458,404 B1 | 10/2002 | Adachi |
| 6,503,546 B1 | 1/2003 | Ferrari-Philippe et al. |
| 6,613,370 B1 | 9/2003 | Pickford |
| 6,620,447 B1 | 9/2003 | Paukkunen et al. |
| 7,147,885 B2 | 12/2006 | Asano et al. |
| 2001/0014363 A1 | 8/2001 | Parker |
| 2001/0024672 A1 | 9/2001 | Kondou et al. |
| 2001/0055641 A1 | 12/2001 | Conforti et al. |
| 2002/0039615 A1 | 4/2002 | Adachi |
| 2002/0119226 A1 | 8/2002 | Conforti et al. |
| 2002/0192332 A1 | 12/2002 | Pickford |
| 2003/0147998 A1 | 8/2003 | Geng et al. |
| 2003/0198711 A1 | 10/2003 | Pickford |
| 2004/0213883 A1 | 10/2004 | Sadek et al. |
| 2005/0169099 A1 | 8/2005 | Sprinkle |
| 2006/0053650 A1 | 3/2006 | Manack et al. |
| 2006/0286240 A1 | 12/2006 | Roosjen |
| 2011/0091612 A1 | 4/2011 | Pickford |
| 2011/0177200 A1 | 7/2011 | Pickford |
| 2011/0177210 A1 | 7/2011 | Pickford |
| 2011/0177211 A1 | 7/2011 | Pickford |
| 2012/0196004 A1 | 8/2012 | Pickford |
| 2012/0196005 A1 | 8/2012 | Pickford |
| 2012/0288592 A1 | 11/2012 | Pickford |
| 2013/0156925 A1 | 6/2013 | Pickford |

FOREIGN PATENT DOCUMENTS

| | | |
|---|---|---|
| DE | 2338180 | 2/1975 |
| EP | 17338 | 10/1980 |
| EP | 109226 | 5/1984 |
| EP | 155760 | 9/1985 |
| EP | 327332 | 8/1989 |
| EP | 344726 | 12/1989 |
| EP | 392119 | 10/1990 |
| EP | 510320 | 2/1992 |
| EP | 273475 | 3/1992 |
| EP | 648433 | 10/1994 |
| EP | 1929887 | 6/2008 |
| EP | 2207434 | 8/2011 |
| EP | 2359697 A2 | 8/2011 |
| EP | 2374361 | 10/2011 |
| EP | 2481294 A1 | 8/2012 |
| EP | 2481295 A1 | 8/2012 |
| EP | 2522230 A1 | 11/2012 |
| EP | 2692242 A1 | 2/2014 |
| FR | 2337534 | 8/1977 |
| FR | 2343668 | 10/1997 |
| GB | 1419455 | 12/1975 |
| GB | 2226220 | 11/1988 |
| JP | 57159451 | 10/1982 |
| JP | 01168242 | 7/1989 |
| WO | 8501188 | 3/1985 |
| WO | 8806007 | 8/1988 |
| WO | 8806847 | 9/1988 |
| WO | 8908549 | 9/1989 |
| WO | 9201384 | 2/1992 |
| WO | 9303634 | 3/1993 |
| WO | 9306752 | 4/1993 |
| WO | 9314995 | 8/1993 |
| WO | 9413160 | 6/1994 |
| WO | 9419917 | 9/1994 |
| WO | 9427887 | 12/1994 |
| WO | 9507629 | 3/1995 |
| WO | 9523523 | 9/1995 |
| WO | 9524110 | 9/1995 |
| WO | 9530344 | 11/1995 |
| WO | 9602149 | 2/1996 |
| WO | 9622228 | 7/1996 |
| WO | 9632026 | 10/1996 |
| WO | 9638054 | 12/1996 |
| WO | 9703572 | 2/1997 |
| WO | 9729653 | 8/1997 |
| WO | 9808399 | 2/1998 |
| WO | 9944439 | 9/1999 |
| WO | 02091864 A1 | 11/2002 |
| WO | 2005036975 A1 | 4/2005 |
| WO | 2005112664 | 12/2005 |
| WO | 2006030333 | 3/2006 |
| WO | 2006082804 | 8/2006 |
| WO | 2008078997 | 7/2008 |
| WO | 2010001101 | 1/2010 |

OTHER PUBLICATIONS

U.S. Appl. No. 13/107,814, Office Action mailed Feb. 13, 2014.
U.S. Appl. No. 14/170,371, "Microwaveable Batter," Wilhelmus Johannes Gerardus Michiels et al., filed Jan. 31, 2014.
"U.S. Appl. No. 14/029,681, Office Action mailed Apr. 2, 2014."
U.S. Appl. No. 12/764,421, Notice of Allowance mailed Apr. 11, 2014.
U.S. Appl. No. 14/249,250, "Stabilisation of microwave heated food substrates," Keith Graham Pickford, filed Apr. 9, 2014.
"U.S. Appl. No. 13/015,486, ""Production of microwaveable coated food products"", Keith Graham Pickford, filed Jan. 27, 2011,".
"U.S. Appl. No. 13/016,491, ""Microwaveable coated food product, and method and apparatus for the manufacture thereof"", Keith Graham Pickford, filed Jan. 27, 2011."
"U.S. Appl. No. 13/107,814, ""Microwaveable batter"""", Keith Graham Pickford, filed May 13, 2011."

(56) References Cited

OTHER PUBLICATIONS

"U.S. Appl. No. 13/331,900, ""Crumb Manufacture"", Pickford et al. filed Dec. 20, 2011."
Altschul, Am., "Low-calorie foods handbook", Georgetown University School of Medicine, Marcel Dekker, Inc., Jul. 29, 1993, pp. 1-10.
Albert, A et al., "Adhesion in fried battered nuggets: Performance of different hydrocolloids as predusts using three cooking procedures", Food Hydrocolloids 23 (2009) 1443-1448.
Henderson, A, "Cellulose ethers—the role of thermal gelation". Dow Chemical Europe, CH-8810 Horgen, Switzerland, 1988: pp. 265-275.
WO application No. PCT/GB96/01685, International Search Report mailed Oct. 29, 1996.
WO application No. PCT/GB97/00924, International Search Report mailed Jul. 30, 1997.
WO application No. PCT/GB99,00564, International Search Report mailed Jun. 29, 1999.
WO application No. PCT/GB92/01559, International Search Report mailed Dec. 30, 1992.
WO application No. PCT/GB95/00958, International Search Report mailed Aug. 22, 1995.
WO patent application No. PCT/GB20111050060, International Search Report and Written Opinion mailed May 23, 2011.
WO patent application No. PCT/GB2011050057, International Search Report mailed May 23, 2011.
WO patent application No. PCT/GB2011050055, International Search Report and Written Opinion mailed May 20, 2011.
"U.S. Appl. No. 09/000,319, Office Action mailed Feb. 3, 1999."
"U.S. Appl. No. 09/000,319, Office Action mailed mailed Mar. 27, 2000."
"U.S. Appl. No. 09/381,848, Office Action mailed Sep. 26, 2000."
"U.S. Appl. No. 09/381,848, Office Action mailed May 8, 2001."
"U.S. Appl. No. 09/646,068, Office Action mailed May 8, 2002."
U.S. Appl. No. 09/646,068, Office Action mailed Feb. 4, 2003.
EP patent application No. 11152421.1, Extended Search Report mailed Jul. 5, 2011.
EP patent application No. 11152415.3, Extended Search Report mailed Jul. 5, 2011.
U.S. Appl. No. 12/764,428, Office Action mailed Jan. 5, 2012.
U.S. Appl. No. 12/764,428, Office Action mialed Jun. 21, 2012.
U.S. Appl. No. 12/764,407, Office Action mailed Oct. 5, 2012.
U.S. Appl. No. 12/764,421, Office Action mailed Oct. 9, 2012.
U.S. Appl. No. 13/015,486, Office Action mailed Oct. 12, 2012.
"FoodSafety.gov, ""Minimum Cooking Temperatures."" downloaded fromhttp://www.foodsafety.gov/keep/charts/mintemp.html on Sep. 30, 2012."
Kuntz, Lynn A., "The Great Cover-Up: Batters, Breadings & Coatings," downloaded from http://www.foodproductdesign.com on Sep. 28, 2012.
U.S. Appl. No. 13/015,491, Office Action mailed Oct. 15, 2012.
WO patent application No. PCT/GB2009/001617, Search Report and Written Opinion mailed Jul. 1, 2008.
EP patent application No. 09772781.2, Communication under Rule 71(3) EPC, intent to grant, mailed Mar. 14, 2011.
U.S. Appl. No. 13/331,900, Office Action mailed Dec. 7, 2012.
Clextral Press Release: New drying technology provides optimal drying for complex products and reduces energy expense, Clextral—a division of Groupe Legris Industries, Jun. 2009.
Clextral Rotante Evolum dryer—new generation for sustainable development, Clextral—a division of Groupe Legris Industries, Jun. 2009.
EP patent application No. 1119483.6, Extended European Search Report mailed Aug. 10, 2012.
Perten, Harald, "Application of the falling number method for evaluating alphaamylase activity," Cereal Chemistry, vol. 41, May 1964, pp. 127-140.
"English translation of Paris GDS Moulins FR 2,458,227, Jan. 1981."
Edwards, W.P., "The Science of Bakery Products," Chapter 7—Raw Materials, The Royal Society of Chemistry, 2007.
English translation of Wiedmann et al., EP 0510320A1, Oct. 1992, downloaded from http://translationportal.epo.org on Jan. 25, 2013.
""""Criteria for Judging Quality,"" published Jun. 20, 2008, downloaded from http://web.archive.org/web/20080620034; 54http://www.theartisan.netflour_criteria_judging.htm on Jan. 25, 2013."
English translation of RU 2277438, Rye-wheat bread and its prol3vodstva, Berestnev et al., Jun. 10, 2006.
U.S. Appl. No. 13/015,486, Office Action mailed Feb. 19, 2013.
U.S. Appl. No. 12/764,428, Office Action mailed Mar. 22, 2013.
U.S. Appl. No. 12/764,421, Office Action mailed Apr. 1, 2013.
U.S. Appl. No. 12/764,407, Office Action mailed Apr. 5, 2013.
U.S. Appl. No. 13/331,900, Office Action mailed Apr. 10, 2013.
EP patent application No. 12178463, European Search Report mailed Jan. 22, 2013.
WO patent application No. PCT/EP2012/076015, International Search Report and Written Opinion mailed May 7, 2013.
"U.S. Appl. No. 13/015,491, Office Action mailed Jun. 5, 2013.".
U.S. Appl. No. 13/107,814, Office Action mailed Jun. 21, 2013.
U.S. Appl. No. 12/669,953, Notice of Allowance mailed Jul. 25, 2013.
EP patent application No. 11163536.3, Communication under Rule 71(3) EPC, Intent to Grant, mailed May 30, 2013.

CRUMB COATING FOR FOOD PRODUCTS

CROSS-REFERENCE TO RELATED APPLICATIONS

This application is a continuation of U.S. patent application Ser. No. 13/953,585, filed Jul. 29, 2013, titled CRUMB COATING FOR FOOD PRODUCTS, which is a divisional of U.S. patent application Ser. No. 12/669,953, filed Apr. 28, 2010, titled CRUMB COATING FOR FOOD PRODUCTS, now issued as U.S. Pat. No. 8,524,301, which is a US National Stage entry under 35 U.S.C. 371 of the International Patent Application No. PCT/GB2009/001617, filed Jun. 30, 2009, titled CRUMB COATING FOR FOOD PRODUCTS, which claims priority to GB Patent Application No. 0811970.3, filed Jul. 1, 2008, titled CRUMB COATING FOR FOOD PRODUCTS. Each of these prior applications is incorporated herein by reference in its entirety and for all purposes.

BACKGROUND OF THE INVENTION

This invention relates to a crumb or breadcrumb (referred to as a crumb for simplicity) for use in coating food products, particularly but not exclusively for food products which are frozen for storage before use. The invention also relates to a process for making the crumb. Particularly preferred crumb coatings are suitable for cooking or reheating from the frozen state using a microwave oven. Especially preferred crumb coatings are also suitable for cooking or reheating using a conventional oven, grill or by frying.

The invention also relates to crumb coated food products, which may be cooked or reheated using any of: a microwave oven, conventional oven, grill or by frying, preferably by any of these methods.

Commercially produced crumb may be made by two processes.

Real breadcrumb is derived from bread baked in a traditional manner and subsequently dried. The bread is then comminuted to form crumb particles of a variety of sieve sizes and dried as required for various coating applications.

In the electrolytic process, bread is baked without using yeast in a similar way to unleavened bread and then dried. The bread may be formed as blocks or pellets and then comminuted to form crumbs of various sizes, which are then dried. This kind of bread can form flakes. Such flakes are commonly referred to as Japanese style crumb.

Commercially produced crumb may deteriorate and become stale after three to six months due to the effects of moisture, microbial damage and a breakdown in the molecular structure of the crumb. This staling manifests itself as a toughness and chewiness of the crumb and may be accompanied by off-flavors. The presence of water is a key factor in this deterioration process.

When commercial crumb is applied to a food substrate such as fish, meat, dairy products, vegetables or fruit followed by flash frying, a crisp coated product may be produced, irrespective of the quality of the crumb prior to frying. However, the fried crumb will deteriorate over time during chilled or frozen storage, despite the fact that the oil introduced during frying acts as a moisture barrier. The rate of deterioration may depend on the quality of crumb used. If a chilled or frozen fried crumb product is heated from the frozen slab using a microwave oven this results in a crumb, which is wet and soggy and therefore unpalatable. Such products are generally recovered from frozen or chilled in the oven and are cooked for 20 minutes, longer at 200° C., or longer. These products cannot be regarded as microwavable.

Problems due to crumb deterioration lead to an inconsistent end product, which does not have a sufficient predetermined shelf life. Variation in the quality of the crumb can lead to a breakdown of the crumb particles causing an excess build-up of fine particles. This results in a poor coating quality.

WO 99/44439 discloses a method of manufacture of a breadcrumb food product wherein a breadcrumb is contacted with an aqueous solution of a gelling agent, followed by drying and application as a coating to a food product.

SUMMARY OF THE INVENTION

According to a first aspect of the present invention, a method of manufacture of a crumb coated food product comprises the steps of:
  forming an aqueous mixture comprising:
  a flour mixture comprising one or more flours,
  sodium bicarbonate,
  optional additives selected from processing aids, salts, colorants and,
  water;
  adding the mixture into an extruder;
  adding an aqueous gelling agent to the extruder;
  extruding the resultant mixture at a temperature greater than 100° C. to form an extrudate;
  allowing the extrudate to expand to form a porous product;
  drying the product, and milling the dried product to form a crumb.

DETAILED DESCRIPTION

The crumb forms coatings, which are preferably reheatable or cookable using a microwave oven. Alternatively or preferably, in addition the crumb forms coatings, which may be reheated or cooked by more than one, preferably all of these methods. This avoids any need for formulation of different crumbs for various products.

The gelling agent is preferably added to the extruder at a point downstream of the start of the extrusion of the flour mixture. This is important to reduce blocking of the extruder screw. The process therefore preferably comprises the steps of extruding the flour mixture, adding the gelling agent of the extruder and extruding the resultant mixture of flour mixture gelling agent.

The process of the present invention has an advantage that the gelling agent is intimately mixed with the flour prior to drying and milling. In this way, the crumb has optimum moisture resistance allowing a cooked product to be frozen for storage and re-heated from the frozen state, for example in a microwave oven.

The flour mixture may comprise two or more flours; a mixture of two flours is particularly advantageous allowing the properties of the mixture to be controlled while retaining simplicity of manufacture.

Preferably, the flour mixture has a low Hagberg Falling Number (HFN). A HFN below 350 is preferred, more preferably less than 250, or even more preferably less than 170. Ranges of 50 to 350, preferably 50 to 250 more preferably, 50 to 170 may be employed. The average HFN may be determined from the HFNs of the individual constituent flours and their relative proportions.

Hagberg Falling Number (HFN) is an indicator of the alpha-amylase activity in flour. A high HFN indicates low alpha-amylase activity. This means that the flour is less degraded by the enzyme.

The Hagberg test is described by S. Hagberg in Cereal Chemistry 3_7,218.222 (1960) and 3.202-203 (1961). In the Hagberg test, the falling number is measured for a flour sample. In this process, the wheat to be analyzed is milled, conventionally in a high-speed hammer mill, and a standard amount of the flour is combined with a standard amount of water in a standard test tube. The mixture is heated for a standard time during which it is gently agitated and then the time is measured for a standard plunger to fall a standard distance through the paste, which is formed. The time (in seconds) for the plunger to fall is added to the time during which the flour water mixture is heated (60 seconds) to give the falling number or the Hagberg number for the wheat sample.

Flours with various gluten contents may be used, although a low gluten content is preferred.

The percentages or other amounts in this specification are by weight unless indicated otherwise and are selected from ranges quoted to total 100%.

A mixture of biscuit flour and wholly or partially denatured flour may be used in the flour mixtures of this invention so that the mixture has the characteristics of a hard flour. This results in a low average HFN. A proportion of about 30-70% flour, which has been partially or wholly denatured by heat treatment, is especially preferred.

A preferred flour mixture comprises

|  | Amount/% | HFN |
| --- | --- | --- |
| First flour | 70-30 | 350 |
| Second flour | 30-70 | 220 |

A further preferred flour mixture comprises:

|  | Amount/% | HFN |
| --- | --- | --- |
| First flour | 60-40 | 350 |
| Second flour | 40-60 | 220 |

A further preferred flour mixture comprises:

|  | Amount/% | HFN |
| --- | --- | --- |
| First flour | 50 | 350 |
| Second flour | 50 | 220 |

The first flour may be selected from:
Heygates C.Heat.A flour (completely thermally denatured);
Hutchisons Golden Queen cake flour (partially thermally denatured) (HFN350);
Condor 3030
The second flour may be selected from:
Heygates DM7 biscuit flour (HFN 50 to 220, depending on seasonal variations, average 120;
Hutchisons Scotch biscuit flour (HFN 220);
Oorevaar/Bindbloem IAF 2633.
The flour mixture is preferably selected by adjustment of the relative proportions of the first and second flours to compensate for seasonal variations in the individual ingredients.

Glyceryl stearate may be used as a processing aid in the flour composition to lubricate the flour mixture during passage through the extruder. An amount of about 0.3 to about 1%, preferably about 0.6% may be employed.

Sodium bicarbonate may be added as conventional baking powder, for example including disodium diphosphate BEX baking powder manufactured by Thermophos International BV may be used.

The gelling agent may be a hydrocolloid. A variety of gums may be employed, for example Arabic, tragacanth, karaya and ghatti. Use of guar gum or locust bean gum is especially preferred. Mixtures of hydrocolloids may be employed.

Modified gums and cellulose derivatives for example carboxyrnethylcellulose, methylcellulose, hydroxypropyl methylcellulose, methyl ethyl cellulose and hydroxypropyl cellulose may also be employed.

Gums, especially guar gum or locust bean gum may be present at a concentration from a trace to about 3% by weight, preferably about 0.25 to about 2.5%, more preferably about 0.7 to about 1.3 most preferably about 1% by weight.

Mixtures of two or more of any of the aforementioned gums may be used. Mixtures of guar gum and xanthan gum are preferred. A small amount of xanthan gum may also be employed, e.g. about 0.1% to 0.75% in addition to the guar gum.

The aqueous gelling agent is preferably injected into the extruder, for example from a pressurized tank or other container at a low-pressure location zone in the extruder so that the flour mixture is partially extruded prior to addition of the gelling agent. The gelling agent in the container may be pressurised and left to stand to allow any air bubbles to escape prior to use.

A processing aid may be added to the gelling agent. Sodium metabisulphite or sodium bisulphite may be added to bleach the flour during the extrusion. An amount of about 1% of sodium metabisulphite in the gel is particularly preferred.

The extrudate may be extruded from the outlet of the extruder as a temperature above 100° C. preferably about 110° C. The expansion of water vapor forms air bubbles within the extrudate so that a porous mass suitable for milling into crumb is obtained after cooling and drying. Heating may be achieved by the sheer force in the extruder or by means of external heating.

The extrudate is preferably cut into pieces as it leaves the extruder so that individual "bubble" pieces are formed during expansion. A rotating blade may be located adjacent the extruder die to cut the emerging flow of extrudate into pieces of a convenient size e.g. 1.0 mm in diameter after expansion. The bubble pieces may be spheroid or preferably a circular, flattened shape to facilitate drying of the interior without over drying of the exterior regions.

Preferred embodiments make use of a twin-screw extruder (TSE) because of the improved mixing, gentler processing and improved kneading capabilities (across a range of initial particle sizes). A single screw extruder can also be used. TSEs also benefit from the fact that, in comparison to single screw extruders, they provide greater process control and positively convey the material between the flights and elements on the screws. Additionally, the complementary nature of the two screws effect a self-cleaning process so the extruder is less likely to suffer from processed product being burnt onto the screw/barrel/die or otherwise retained in a particular zone of the extruder for an inappropriate length of time.

In the TSE, there may be essentially three regions, namely: i) the feed zone for the flour mixture; ii) the feed zone for the gelling agent, and iii) the mixing zone. The TSE therefore acts as a complete processing apparatus in which ingredients are sequentially fed into the extruder and mixed, formed, extruded and sheared in one continuous process. The high temperatures that can exist within the TSE provide an effective bleaching and sterilization process that activates the bisulphite bleaching agent, and destroys harmful microorganisms while minimizing the loss of nutrients or flavors in the food being produced.

Within a barrel of the TSE, intermeshed co-rotating screws (or counter rotating screws, subject to choice) cooperate to produce a homogenized mixture that, ultimately, is continuously extruded through the die to produce an expandable, formable or pelletized product. Generally, shear (mechanical) heating is the predominant process within the extruder, although temperature control (including temperature maintenance) may be achieved through the use of barrel heaters strategically located along zones of the extruder.

In the feed zone, raw ingredients are fed into the head of the extruder (remote from the die) from the storage tanks. In the mixing zone, the mixture is homogenized. Finally, the shape of the product is formed in the forming zone. In the preferred embodiment, the TSE forms an expanded product since the process gradually increases temperatures and pressures, while the moisture content in the mix is accurately controlled. When the mixture is forced through the die, the mixture experiences a change in atmospheric pressure whereby internal moisture turns to steam and causes the expansion or puffing out of the cooked mixture to form the "bubble". A circular die or an array of circular dies may be employed. Preferred dies have a diameter of 1 to 5 mm. Star shaped dies may be also used. The swell time in the extruder may be about 3 to 6 seconds.

According to a second aspect of the present invention there IS provided a crumb manufactured in accordance with the present invention.

According to a third, aspect of the present invention there is provided a crumb coated food product comprising a substrate coated with crumb manufactured in accordance with a first aspect of this invention.

The crumb in accordance with this invention may be applied to a variety of food substrates including red meat, chicken, fish, cheese and vegetable. The substrate may be treated beforehand with a stabilizer composition as disclosed in WO 97/03572, the disclosure of which specification is incorporated herein by reference for all purposes.

The invention is further described by means of example but not in any limitative sense.

Example 1

A flour composition was prepared as follows:

| | |
|---|---|
| Flour mixture | 96.4% |
| Sodium bicarbonate (Bex baking powder) | 2.0% |
| Glyceryl Monostearate (Abimono SS40P) | 0.6% |
| Salt | 1.0% |
| | 100% |

A Clextral twin-screw machine extruder was used but a Buhler twin-screw extruder may be used.

The gelling agent Novatex SC2 was as follows:

| | |
|---|---|
| Guar gum | 67.00% |
| Sodium metabisulphite | 33.00% |
| | 100% |

The Novatex SC2 is then hydrated at 3% in 97% water. This can be done using a paddle mixer but a high shear mixer is preferred. The hydrated mix should stand for at least 12 hours after mixing.

The ingredients were mixed in a holding tank sited at the rear of the extruder.

Four flour mixtures were used.

Run 1

Hutchinsons Golden cake flour (150 kg per hour) was mixed with water (35 kg per hour) to form a slurry. The slurry was fed into the extruder. The hydrated gelling agent was injected into the flat zone of the extruder in an amount of 7.5% (13.88 kg per hour). The extruded mixture was chopped into pieces and allowed to expand to form a bubble. When dried to a moisture content of 2% w/w the bulk density was 150 g·l$^{-1}$. The bubble was dried and milled and the resulting crumb was short and crisp. Application to a food substrate made a hard crumb coating. The dried bag product had a shelf life exceeding 12 months.

Run 2

The flour mixture was:
Hutchisons Golden Queen cake flour (HFN 350 50%)
Hutchison Scotch Biscuit flour 16 (HFN 220 50%)
The dry mixture (150 kg per hour) was blended with water (35 kg per hour) to give a slurry (185 kg per hour) and injected into the extruder. The gel composition was injected at 7.5% by weight (13.88 kg per hour). The resultant bubble was slightly lighter smaller and more compact. When dried to 2% the bulk density was 182 g·l$^{-1}$. After drying and milling, the crumb was found to be crisp, short but with a harder bite than in Run 1. The crumb was resilient, coated the product well and was stable with a shelf life exceeding 12 months, the product resisted moisture migration.

Run 3

The flour mixture was:
Hutchisons Biscuit flour.
The flour mixture (1.50 kg per hour) was blended into particle sizes.

Crumb Particle Analysis for Run 2

| | MIN | MAX |
|---|---|---|
| Retained on a 4.00 mm sieve | 3% | 5% |
| Retained on a 3.50 mm sieve | 10% | 20% |
| Retained on a 2.00 mm sieve | 25% | 40% |
| Retained on a 1.00 mm sieve | 20% | 25% |
| Through a 1.00 mm sieve | 20% | 25% |

Example 2

A flour composition was prepared in accordance with example 12, except that the following flour mixture was used.

| | |
|---|---|
| Condor 3030 | 50% |
| Ooievaar/Bindbloem IAF 2633 | 50% |

A Clextral twin-screw extruder was used. Mixing was undertaken in 50 liter containers using a small paddle mixture in 5×30 kg batches. The 150 kg of the mixture was then poured into a stainless steel tank for use on the production line. The gel was injected at 7.5% and produced an expanded bubble with a bulk density of 182 g·1-1 when dried to a moisture content of 2% w/w or lower.

The dry ingredients (249 kg per hour) were blended with water (68.1 kg per hour) to give a slurry (317.1 kg per hour). The gel was injected at 7.5% (23.78 kilos per hour).

The bubble was wet milled and dried at a 100° C. to a moisture content of 6.44°. The bulk density of the dried milled crumb was 235 gl$^{-1}$ but the moisture content was 2%. A 5 mm die was found to give the best results.

Example 3

A flour composition was prepared Ill accordance with example 1, except that the following flour mixture was used:

| | |
|---|---|
| Heygates B C.Heat.A flour | 50% |
| Heygates DM7 biscuit flour | 50% |

The mixture was extruded on a Clextral extruder. The bubble was dried to a moisture content below 2% and then milled. Drying was carried out in a fluid bed dryer at around 90° C. for 15 minutes.

The dried product was milled to specific grist sizes and blended as required for the particular products.

For example, four chicken pieces were coated with a pre-dust (CFS Opti Flour) and batter was applied using a tempura batter applicator. Coating of the crumb prepared in example 3 was applied in a single pass using a CFS Crumb Master. The coated product was fried at 184° C. for up to 3.5 minutes using rapeseed oil. The fried product was cryogenically frozen packed and stored in steel containers at −18° C. After storage for 30 days, the products were heated in an 850 W oven for 2.5 min. The cores of the particles reached a minimum 70° C. and were left to stand for 3 minutes before testing. The chrysalis of the product was analyzed and found to be satisfactory.

Example 4

Pre-dust (CFS Opti flour) was hydrated to a concentration of 1% and the gel was applied to the chicken pieces using a tempura batter applicator. A coating of fine crumbs was applied to the gel using a Crumb Master crumb applicator. The fines had a dimension less than 1 mm. Batter was applied using a tempura batter applicator and the crumb of example 3 was applied using a CFS Crumb Master applicator. The product was fried at 184° C. for 3.5 minutes alternatively the coated product was flash fried for up to 1.5 minutes and further cooked in a hot air tunnel at 2.20° C. or higher for up to 4 minutes to give the desired result. The cooked product was cooled with air knives when exiting the fryer or hot air tunnel. The product was cryogenically frozen, packed in impermeable packaging, preferably gas flushed with nitrogen, and stored with a core temperature at −25° C. or lower.

The invention claimed is:

1. A crumb manufactured by a process of manufacture comprising the steps of: forming an aqueous mixture comprising: a flour mixture comprising one or more flours, sodium bicarbonate, and water; adding the aqueous mixture into an extruder; partially extruding the aqueous mixture through the extruder forming a homogenized aqueous mixture prior to addition of an aqueous gelling agent; adding the aqueous gelling agent to the extruder at a point downstream of the start of the extrusion of the aqueous mixture through the extruder to form a resultant mixture of the aqueous mixture and the aqueous gelling agent in the extruder; extruding the resultant mixture through and from the extruder at a temperature greater than 100° C. to form an extrudate; allowing the extrudate to expand to form a porous product; drying the porous product to form a dried product; and forming a crumb from the dried product.

2. The crumb of claim 1, wherein the step of forming a crumb comprises milling the dried product to form the crumb; and wherein the crumb is resistant to moisture such that it retains crispness upon exposure to moisture during cooking.

3. The crumb of claim 1, wherein the crumb is resistant to moisture such that it retains crispness upon freezing and reheating.

4. The crumb of claim 1, wherein the flour mixture comprises two or more flours.

5. The crumb of claim 4, wherein the flour mixture comprises wholly or partially denatured flour.

6. The crumb of claim 1, wherein the flour mixture comprises:

| | Amount (%) | Hagberg Falling Number (HFN) |
|---|---|---|
| A first flour | 70-30 | 350 |
| a second flour | 30-70 | 220. |

7. The crumb of claim 1, wherein the gelling agent is a hydrocolloid.

8. The crumb of claim 1, wherein the gelling agent is selected from the group consisting of: gum Arabic, gum tragacanth, karaya gum, ghatti gum, and combinations thereof.

9. A crumb manufactured by a process of manufacture comprising the steps of: forming an aqueous mixture comprising: a flour mixture comprising one or more flours, sodium bicarbonate, and water; adding the aqueous mixture into an extruder; partially extruding the aqueous mixture through the extruder forming a homogenized aqueous mixture prior to addition of guar gum; adding the guar gum to the extruder at a point downstream of the start of the extrusion of the aqueous mixture through the extruder to form a resultant mixture of the aqueous mixture and the guar gum in the extruder; extruding the resultant mixture through and from the extruder at a temperature greater than 100° C. to form an extrudate; allowing the extrudate to expand to form a porous product; drying the porous product to form a dried product; and milling the dried product to form a crumb.

10. The crumb of claim 1, wherein the gelling agent includes sodium metabisulphite or sodium bisulphite.

11. A crumb coated food product, comprising: a substrate; a crumb coated on the substrate, the crumb manufactured by a process of manufacture comprising the steps of: forming an aqueous mixture comprising: a flour mixture comprising one or more flours, sodium bicarbonate, and water; adding the aqueous mixture into an extruder; partially extruding the aqueous mixture through the extruder thereby forming a homogenized aqueous mixture; adding an aqueous gelling agent to the extruder at a point after the homogenized aqueous mixture is formed by the extruder to form a resultant mixture of the homogenized aqueous mixture and the aqueous gelling agent in the extruder; extruding the resultant mixture through and from the extruder at a temperature greater than 100° C. to form an extrudate; allowing the extrudate to expand to form a porous product that is configured to be milled after the drying of the product; drying the porous product to form a dried product; and milling the dried product to form a crumb.

12. The crumb coated food product of claim 11, wherein the crumb is resistant to moisture such that it retains crispness following exposure to moisture during cooking of the food product.

13. The crumb coated food product of claim 11, wherein the crumb is resistant to moisture such that it retains crispness following freezing and reheating of the food product.

14. The crumb coated food product of claim 11, wherein the flour mixture comprises two or more flours.

15. The crumb coated food product of claim 14, wherein the flour mixture comprises wholly or partially denatured flour.

16. The crumb coated food product of claim 11, wherein the flour mixture comprises:

|  | Amount (%) | Hagberg Falling Number (HFN) |
|---|---|---|
| a first flour | 70-30 | 350 |
| a second flour | 30-70 | 220. |

17. The crumb coated food product of claim 11, wherein the gelling agent is a hydrocolloid.

18. The crumb coated food product of claim 11, wherein the gelling agent is selected from the group consisting of gum Arabic, gum tragacanth, karaya gum, ghatti gum, and combinations thereof.

19. The crumb coated food product of claim 11, wherein the gelling agent comprises about 0.7% to 1.3% guar gum.

20. The crumb coated food product of claim 11, wherein the gelling agent includes sodium metabisulphite or sodium bisulphite.

* * * * *